US010997951B2

(12) United States Patent
Wicks et al.

(10) Patent No.: US 10,997,951 B2
(45) Date of Patent: May 4, 2021

(54) PRESERVING SAMPLE DATA IN FOVEATED RENDERING OF GRAPHICS CONTENT

(71) Applicant: QUALCOMM Incorporated, San Diego, CA (US)

(72) Inventors: Jonathan Wicks, Louisville, CO (US); Tate Hornbeck, Somerville, MA (US); Robert Vanreenen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/247,964

(22) Filed: Jan. 15, 2019

(65) Prior Publication Data
US 2019/0318709 A1    Oct. 17, 2019

Related U.S. Application Data

(60) Provisional application No. 62/657,415, filed on Apr. 13, 2018.

(51) Int. Cl.
*G09G 5/391* (2006.01)
*G09G 5/373* (2006.01)
*G06F 3/01* (2006.01)

(52) U.S. Cl.
CPC .............. *G09G 5/373* (2013.01); *G09G 5/391* (2013.01); *G06F 3/013* (2013.01);
(Continued)

(58) Field of Classification Search
CPC .. G09G 5/373; G09G 5/391; G09G 2360/122; G09G 2354/00; G09G 2350/00;
(Continued)

(56) References Cited

U.S. PATENT DOCUMENTS 9,396,515 B2 *   7/2016   Lum ........................ G06T 1/60
9,633,452 B2 *   4/2017   Wendt .................. G06T 11/001
(Continued)

OTHER PUBLICATIONS

International Search Report and Written Opinion—PCT/US2019/024851—ISA/EPO—Aug. 9, 2019
(Continued)

*Primary Examiner* — Said Broome
(74) *Attorney, Agent, or Firm* — QUALCOMM Incorporated

(57) ABSTRACT

Example techniques are described for generating graphics content by assigning a first region of the graphics content to a first tile, assigning a second region of the graphics content to a second tile, determining, at the first tile and at a first resolution, a first set of samples of the graphics content for each pixel of multiple pixels associated with the first region, determining, at the second tile and at a second resolution that is lower than the first resolution, a second set of samples of the graphics content for each pixel of multiple pixels associated with the second region, downsampling the first set of samples into a combined set of samples, preserving samples of the second set of samples to generate a third set of samples with preserved samples, storing the combined set of samples, and storing the third set of samples with preserved samples.

20 Claims, 9 Drawing Sheets

(52) U.S. Cl.
CPC .............. *G09G 2340/0407* (2013.01); *G09G 2350/00* (2013.01); *G09G 2354/00* (2013.01); *G09G 2360/122* (2013.01)

(58) Field of Classification Search
CPC .. G09G 2340/0407; G06F 3/013; G06T 11/40
See application file for complete search history.

(56) References Cited

U.S. PATENT DOCUMENTS

| | | |
|---|---|---|
| 2014/0267377 A1* | 9/2014 | Halstvedt ................ G06T 11/40 345/613 |
| 2018/0047203 A1 | 2/2018 | Grossman et al. |
| 2018/0068640 A1 | 3/2018 | Martin |

OTHER PUBLICATIONS

Vaidyanathan K., et al., "Coarse Pixel Shading," High Performance Graphics, Intel Corporation, Lund University, The Eurographics Association, 2014, 10 pp.

* cited by examiner

PRESERVING SAMPLE DATA IN FOVEATED RENDERING OF GRAPHICS CONTENT

This application claims the benefit of U.S. Provisional Patent Application 62/657,415, filed Apr. 13, 2018, the entire content of which is incorporated by reference.

BACKGROUND

An electronic device may execute a program to present graphics content on a display. For example, an electronic device may execute a virtual reality (VR) program or an augmented reality (AR) program.

In some applications, graphics presented at a display may be rendered at different resolutions in the same frame. For example, in a VR headset, the center of the frame (e.g., the region(s) intended to be in the user's foveal vision) may be rendered at a higher resolution and the remainder of the frame (e.g., the region(s) intended to be in the user's peripheral vision) may be rendered at a lower resolution. As an additional example, an electronic device may track a gaze of a user (e.g., using a sensor) to identify a graphics portion that will be in the user's foveal vision. If the electronic device determines that eye movement of the user follows a particular object presented at a display, the electronic device may render the region(s) of the object at a higher resolution and render other regions in lower resolution(s).

SUMMARY

Methods, devices, apparatus, and computer-readable media for generating graphics content are described herein. A method can include assigning a first region of the graphics content to a first tile of multiple tiles, assigning a second region of the graphics content to a second tile of the tiles, determining, at the first tile and at a first resolution, a first set of samples of the graphics content for each pixel of multiple pixels associated with the first region, determining, at the second tile and at a second resolution that is lower than the first resolution, a second set of samples of the graphics content for each pixel of multiple pixels associated with the second region, downsampling the first set of samples into a combined set of samples, preserving samples of the second set of samples to generate a third set of samples with preserved samples, storing the combined set of samples, and storing the third set of samples with preserved samples.

The method can further include generating an image based on the combined set of samples and the third set of samples with preserved samples that are stored, and displaying the image on a virtual reality headset or a wireless communication device.

In some embodiments, downsampling the first set of samples can include downsampling the first set of samples at a first scale, and preserving the samples can include downsampling the second set of samples by a second scale that is less the first scale.

In further embodiments, preserving the samples can include copying the second set of samples in the second tile, or upscaling the second plurality of samples.

In still further embodiments, the upscaling can include nearest sampling or weighted sampling.

The method can further include determining that the first region is in the foveal vision of a user, and determining to render the first region at the first resolution based on the determining.

In some embodiments, the first region is predetermined to be rendered at a first resolution, and the first region is a center region in the graphics content.

The method can further include assigning a third region of the graphics content to a third tile of the tiles, and determining, at the third tile and at a third resolution that is lower than the first resolution, a third set of samples of the graphics content for each pixel of multiple pixels associated with the third region, where the second resolution is different than the third resolution.

In some embodiments, the second resolution is at least one of one half of the first resolution, one fourth of the first resolution, or one eighth of the first resolution.

In further embodiments, a number of samples determined for each pixel of the graphics content is at least one of two, four, or eight.

In still further embodiments, storing the combined set of samples and storing the third set of samples with preserved samples includes storing the combined set of samples and the third set of samples with preserved samples in system memory.

A device can include a processor, and a memory coupled to the processor that includes instructions that, when executed by the processor, cause the device to perform a method that includes assigning a first region of the graphics content to a first tile of multiple tiles, assigning a second region of the graphics content to a second tile of the tiles, determining, at the first tile and at a first resolution, a first set of samples of the graphics content for each pixel of multiple pixels associated with the first region, determining, at the second tile and at a second resolution that is lower than the first resolution, a second set of samples of the graphics content for each pixel of multiple pixels associated with the second region, downsampling the first set of samples into a combined set of samples, preserving samples of the second set of samples to generate a third set of samples with preserved samples, storing the combined set of samples, and storing the third set of samples with preserved samples.

A computer-readable medium can be a non-transitory computer-readable medium that stores a program containing instructions that, when executed by a processor of a device, cause the device to perform a method that includes assigning a first region of the graphics content to a first tile of multiple tiles, assigning a second region of the graphics content to a second tile of the tiles, determining, at the first tile and at a first resolution, a first set of samples of the graphics content for each pixel of multiple pixels associated with the first region, determining, at the second tile and at a second resolution that is lower than the first resolution, a second set of samples of the graphics content for each pixel of multiple pixels associated with the second region, downsampling the first set of samples into a combined set of samples, preserving samples of the second set of samples to generate a third set of samples with preserved samples, storing the combined set of samples, and storing the third set of samples with preserved samples.

An apparatus can include means for assigning a first region of the graphics content to a first tile of multiple tiles, means for assigning a second region of the graphics content to a second tile of the tiles, means for determining, at the first tile and at a first resolution, a first set of samples of the graphics content for each pixel of multiple pixels associated with the first region, means for determining, at the second tile and at a second resolution that is lower than the first resolution, a second set of samples of the graphics content for each pixel of multiple pixels associated with the second region, means for downsampling the first set of samples into a combined set of samples, means for preserving samples of the second set of samples to generate a third set of samples with preserved samples, means for storing the combined set of samples, and means for storing the third set of samples with preserved samples.

DETAILED DESCRIPTION

Figure 1:
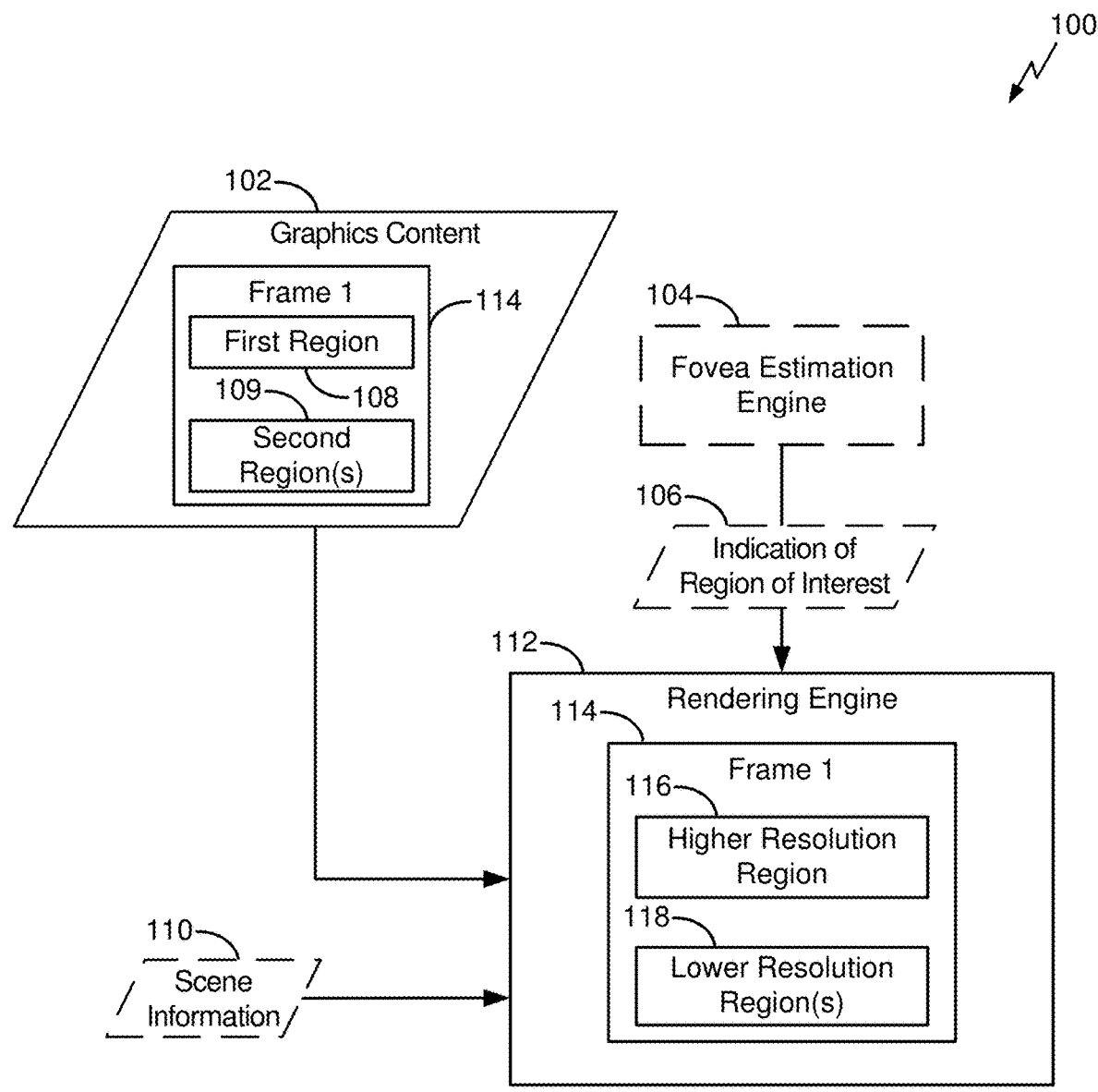
FIG. 1 is an example diagram of a device that can perform foveated rendering, consistent with disclosed embodiments.

The systems, devices, computer-readable media, and methods disclosed herein may provide approaches for rendering regions of frames of computer graphics content differently based on a position of one or more eyes of a user relative to a coordinate system and/or a device (hereinafter, an "eye position"). For example, a higher resolution region and one or more lower resolutions regions may be rendered in the same image/frame. As used herein, a higher resolution may be any region that is greater than a lower resolution region. In various embodiments, a higher resolution can be, for example, 1400×1200 pixels, 1080×1200 pixels, etc. and lower resolutions can be, for example, one half, one quarter, one eighth, one sixteenth, etc. of the higher resolution. These resolutions are merely examples and are not intended to be limiting. In some embodiments, a higher resolution can represent a full resolution of a display device and lower resolutions can be fractional resolutions of the full resolution. In other embodiments, a higher resolution can be greater or less than a full resolution of a particular display device and the higher resolution may be downsampled or upscaled before being displayed on the particular display device.

As used herein, a "region" of the graphics content can refer to a regular grid in optical space corresponding to a subset of a frame of the graphics content. In some embodiments, the regions can be the same for each frame of the graphics content. For example, each frame of the graphics content can be segmented into the same 64 regions. In other embodiments, the number and shapes of the regions can vary from frame to frame in the graphics content.

Rendering inefficiency may be one current technical problem in computer graphics rendering. For example, generating graphics content using a VR program, application, and/or device may include rendering two views of graphics content, which may make content twice as slow to render (potentially causing some latency, limiting available bandwidth on hardware component buses, affecting the displayed frame rate, affecting the motion to photon latency, etc.) and/or cause a device to utilize more power. One approach to solve the technical problem may be to render a region of the graphics content using parameters that utilize more processing resources (e.g., at a higher resolution) and render the other region(s) of the scene at using parameters that utilize fewer processing resources (e.g., at one or more lower resolutions).

For example, in some instances, the user may be primarily focused on the center of the graphics content. Thus, the outer portions are more likely to be in the user's peripheral vision such that, for example, the user's visual system cannot recognize artifacts and/or appreciate detail at the same levels as in the center of the graphics content. Accordingly, the user's experience may not be negatively impacted by rendering the outer regions at one or more lower resolutions and rendering efficiency is gained by not rendering those regions at a higher resolution.

In some instances, identifying the region of the user's gaze may involve performing eye tracking to determine a region of the graphics content in the user's foveal vision. As used herein, a user's foveal vision can refer to vision in the center of the user's field of vision, where visual acuity is usually the highest. As additionally used herein, a region of graphics content in (or determined to be in) the user's foveal vision can refer to a region of the graphics content that represents the intersection of a projection of the user's foveal vision and a two-dimensional cross section of the graphics content that intersects the projection.

Once the region of the graphics content in the user's foveal vision is determined, this approach may include rendering the region at a higher resolution and rendering the other region(s) of the scene at one or more lower resolutions. Again, because the regions in the user's foveal vision remain in higher resolution, the user's experience may not be negatively impacted by rendering the region(s) in the user's peripheral vision at one or more lower resolutions and rendering efficiency is gained by not rendering those region(s) at a higher resolution. As used herein, a user's peripheral vision can refer to vision that is outside of the user's foveal vision.

As used herein, "foveated rendering" can refer to the process of rendering different regions of a scene based on different foveation parameters. The foveation parameters can include, but are not limited to, resolutions, AA levels, blurring levels, and filters to apply.

As further used herein, a "foveated region" can refer to a region in one or more frames of graphics content that is rendered using parameters that utilize more processing resources. In some embodiments, a foveated region can be determined based on the region being determined, predicted, and/or presumed to be within the user's foveal vision. For example, foveated regions can be regions that are rendered at higher resolutions, with higher AA levels, with lower blurring levels, with filters to improve the quality of the region, and the like. In contrast, "non-foveated regions" can refer to regions in one or more frames of graphics content that are rendered using parameters that utilize fewer processing resources. In some embodiments, a non-foveated region can be determined based on the region not being determined, predicted, and/or presumed to be within the user's foveal vision (e.g., within the user's peripheral vision). For example, non-foveated regions can be regions that are rendered at lower resolutions, with lower AA levels, with higher blurring levels, with filters to improve processing efficiency, and the like.

Foveated rendering can include, for example, rendering regions at predetermined resolutions (hereinafter, "static foveated rendering") and rendering regions at different resolutions based on eye tracking (hereinafter, "dynamic foveated rendering").

In some embodiments, foveated rendering can be used with multisample anti-aliasing (MSAA). MSAA is a type of spatial anti-aliasing that can be used to improve image quality by supersampling multiple locations for a pixel. MSAA is useful in many computer graphics use-cases. For example, VR and AR headsets may position display screens within a few inches of a user's eyes and, thus, the improved image quality will be noticeable to the user. Examples used herein may refer to VR and AR, however, various embodiments may not be limited to VR and AR, and can also apply mixed reality (MR), augmented virtuality (AV), and the like. Collectively, VR, AR, MR, and AV can be referred to as extended reality (XR). All references to VR and AR herein can, in various embodiments, apply alternatively or additionally to any other type of XR.

However, in some instances, MSAA can introduce aliasing and other artifacts because the multisampling calculates textures only once per pixel. Thus, the aliasing and other artifacts introduced by MSAA is another technical problem with computer graphics rendering.

As discussed in further detail below, these technical problems can be addressed by preserving samples in lower resolution regions. In foveated rendering using MSAA, because there are multiple samples for at least some pixel locations in the final display (e.g., in higher resolution regions), the samples are downsampled before being stored in system memory. However, samples from lower resolution regions include less information than higher resolution regions. Accordingly, if both types of regions are downsampled by the same scale, then the lower resolution regions will have less sample information than there are pixel positions. Additionally, when the lower resolution regions are upscaled after being downsampled, sample information will be lost. Thus, foveated rendering using MSAA can be improved by preserving the samples of lower resolution regions.

As used herein, a "sample" or a "sample value" can refer to value that represents the intersection of a channel (e.g., red, green, or blue) and a pixel. In some embodiments, reference to a sample can include a sample with multiple subsamples. For example, in red, green, blue (RGB) color space, a sample can include 3 subsamples, and in red, green, blue, alpha, (RGBA) color space, a sample can include 4 subsamples.

As used herein, "preserving" or "preserving samples" can refer to a process, or lack thereof, performed on a region (e.g., a lower resolution region) of one or more frames of graphics content that results in more samples than downscaling by scale equal to a scale at which downsampling is performed on another region (e.g., a higher resolution region) of the one or more frames of graphics content. For example, "preserving" or "preserving samples" can include downsampling a first region of one or more frames of graphics content by a scale that is less than a scale at which downsampling is performed on a second region of the one or more frames of graphics content. As an additional example, "preserving" or "preserving samples" can include not downsampling or upscaling and/or copying, without downsampling or upscaling, a first region of one or more frames of graphics content whereas downsampling is performed on a second region of the one or more frames of graphics content. As a further example, "preserving" or "preserving samples" can include upscaling a first region of one or more frames of graphics content whereas downsampling is performed on a second region of the one or more frames of graphics content.

Various configurations are now described with reference to the FIGs., where like reference numbers may indicate functionally similar elements. The systems and methods as generally described and illustrated in the FIGs. herein could be arranged and designed in a wide variety of different configurations. Thus, the following more detailed description of several configurations, as represented in the Figures, is not intended to limit scope, as claimed, but is merely representative of the systems and methods.

FIG. 1 depicts an illustrative example of a device 100 that can perform foveated rendering. The device 100 can include or be included in a graphics processing unit (GPU) or any other type of processing unit (e.g., a central processing unit (CPU) or a digital signal processor (DSP)) that is configured to perform a graphics processing operation using the graphics content 102, as an illustrative example. In some examples, the graphics content 102 may correspond to graphics content from an AR or a VR application.

The graphics content 102 can include one or more frames, such as a first frame 114. The first frame 114 may include a first region 108 and one or more second regions 109. In various embodiments, the graphics content 102 can be generated based on a state of an AR or a VR application, based on position information of the device 100 (e.g., based on global positioning system (GPS) coordinates, local coordinates, locations of real-world objects, etc.), based on an orientation of the device 100, and/or based on determined motion of the device, a user (e.g., head or eye position), or a real-world object captured by a camera (not pictured) of the device 100.

In some embodiments, the device 100 can include a fovea estimation engine 104 (e.g., for dynamic foveated rendering). In other embodiments, fovea information may not be used, and the device 100 may not include the fovea estimation engine 104 (e.g., for static foveated rendering).

The device 100 can further include a rendering engine 112 that performs foveated rendering of graphics content 102. For example, the first region 108 of the first frame 114 may be a region that is rendered in a higher resolution. Accordingly, the first frame 114 in the rendering engine 112 can include a higher resolution region 116 that is based on the first region 108 of the first frame 114 of the graphics content 102. Additionally, the second region(s) 109 of the first frame 114 may be region(s) that is/are rendered at lower resolution(s). For example, all of the second region(s) can be rendered at one fourth of the higher resolution, one of the second regions can be rendered at one half of the higher resolution and another of the second regions can be rendered at one eighth of the higher resolution, etc. The first frame 114 in the rendering engine 112 can include one or more lower resolution regions 118 that is based on the one or more second regions 109 of the first frame 114 of the graphics content 102.

In some implementations, the rendering engine 112 may be, may include, or may be part of a GPU or another type of processor.

In embodiments that include the fovea estimation engine 104, the fovea estimation engine 104 may be configured to generate an indication 106 of a region of interest (e.g., the first region 108) of the graphics content 102. For example, the fovea estimation engine 104 may receive eye position information from a sensor (not pictured) and determine a region of interest within a display that is within a user's foveal vision. In some embodiments, the region of interest may be associated with the first region 108 of the first frame 114. The fovea estimation engine 104 can send an indication of the region of interest to the rendering engine 112, and the rendering engine 112 can determine that the first region 108 should be the higher resolution region 116 and the second region(s) 109 (not in the region of interest) should be the one or more lower resolution regions 118.

In some implementations, the fovea estimation engine 104 may be part of the same processor as the rendering engine 112 while, in other implementations, the fovea estimation engine 104 may part of a separate processor.

In some examples, e.g., when the graphics content 102 and the device 100 correspond to an AR application, the device 100 may receive scene information 110. For example, the scene information 110 may be captured by a camera (not pictured) of the device 100, and the device 100 may superimpose the graphics content 102 on the scene information 110.

Figure 2:
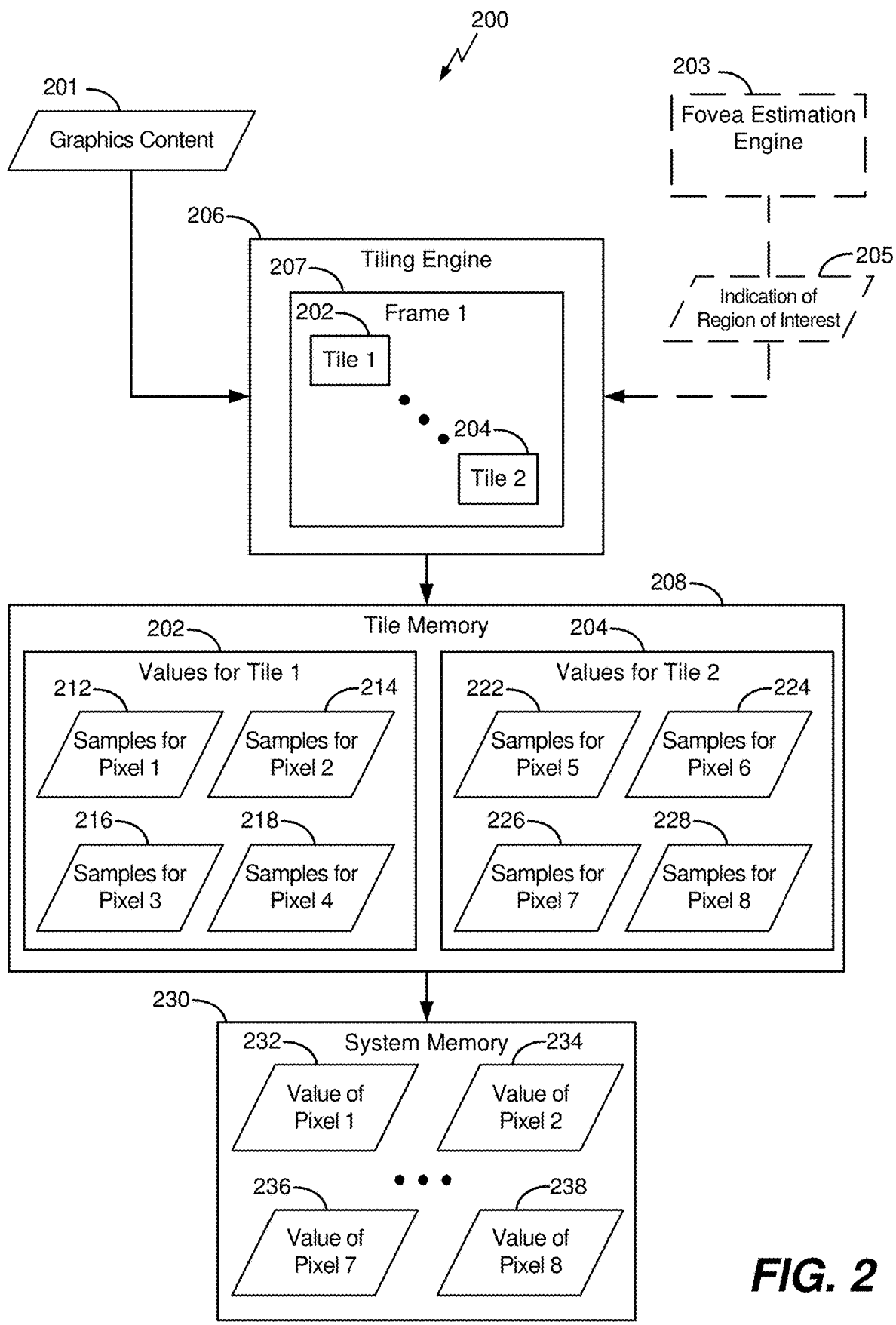
FIG. 2 is an example diagram of a device that can perform foveated rendering, consistent with disclosed embodiments.

Referring to FIG. 2, an illustrative example of a device 200 that can perform foveated rendering is depicted. In various embodiments, the device 200 can be the same or similar to the device 100 in FIG. 1. In the example of FIG. 2, the device 200 can be configured to render graphics content using tiled rendering and, accordingly, can include a tiling engine 206.

As described herein, tiled rendering can refer to a process of segmenting a frame of graphics content by a regular grid in optical space and rendering each section of the grid (i.e., each tile) separately. Using tiled rendering can provide technical advantages because the amount of memory and bandwidth may be reduced compared to rendering systems that draw the entire frame at once. Accordingly, tiled rendering may be useful in any type of device that can generate a display (e.g., laptop computers, desktop computers, advanced driver assistance systems, etc.), but is particularly common in mobile devices, such as cellular handsets (e.g., smartphones), VR and/or AR headsets, smart glasses, smartwatches, and the like.

As used herein, a "tile" can refer to the grid in optical space (e.g., a 16×16 or a 32×32 grid of pixels) and/or a "tile" can refer to a section of tile memory where the samples values associated with the grid in optical space are stored.

In some embodiments, the tiling engine 206 can be part of a rendering engine (e.g., the rendering engine 112 in FIG. 1). As shown in FIG. 2, the tiling engine 206 can receive graphics content 201. In some embodiments, the tiling engine 206 may also receive an indication 205 of a region of interest (e.g., for dynamic foveated rendering) from a fovea estimation engine 203. In other embodiments, a region of interest may not be received by the tiling engine (e.g., for static foveated rendering).

The tiling engine 206 can be configured to perform a tiling process associated with processing of the graphics content 201. The tiling process may include determining a set of tiles associated with the graphics content 201. For example, each frame of the graphics content 201 can be segmented into regions, where each region corresponds to a tile, multiple regions correspond to a tile, and/or a tile corresponds to multiple regions. To illustrate, FIG. 2 depicts that a first frame 207 may be segmented into a set of tiles that includes a first tile 202 (e.g., a first region of the first frame 207) and a second tile 204 (e.g., a second region of the first frame 207). The first frame 207 may include additional tiles for addition regions in the first frame 207.

In the example of FIG. 2, the tiling engine 206 may be configured to render samples of the graphics content 201 as a set of values for each tile associated with the first frame 207 (e.g., by performing an operation (for example, a vertex shading operation, a texture operation, a rasterization operation, one or more other operations, or a combination thereof) to determine a value for one or more samples for each pixel in the region associated with the tile). In some embodiments, a value of a sample may be associated with a color value (e.g., an RGB color value) and may be determined based on a location of the sample in the frame of the graphics content and objects that overlap that location in the frame. As used herein, a "pixel" can refer to a pixel in the final display (e.g., a 1920×1080 display has 2,073,600 pixels). Additionally, as also used herein, a "pixel" can refer to data in memory that ultimately corresponds to one pixel in the final display (if the resolution of the display is the same as in memory), more than one pixel in the final display (if the resolution of the display is larger than in memory), or less than one pixel and/or part of one pixel in the final display (if the resolution of the display is smaller than in memory).

Each tile can be rendered separately, values can be generated for each sample, and the values can be stored in a tile memory 208. If MSAA is used, multiple samples can be associated with each pixel location in a display, and a value can be generated for each sample. For example, the tile memory 208 can include values for the first tile 202, which can include multiple samples for a first pixel 212, multiple samples for a second pixel 214, multiple samples for a third pixel 216, and multiple samples for a fourth pixel 218. Additionally, the tile memory 208 can include values for the second tile 204, which can include multiple samples for a fifth pixel 222, multiple samples for a sixth pixel 224, multiple samples for a seventh pixel 226, and multiple samples for an eighth pixel 228.

In some embodiments, the samples can then be stored in a system memory 230. For example, the samples for the first pixel 212 can be stored as a value for the first pixel 232 in the system memory 230, the samples for the second pixel 214 can be stored as a value for the second pixel 234 in the system memory 230, the samples for the seventh pixel 226 can be stored as a value for the seventh pixel 236 in the system memory 230, and the samples for the eighth pixel 228 can be stored as a value for the eighth pixel 238 in the system memory 230. The samples for the third-sixth pixels may also be stored as values in the system memory 230.

In further embodiments, the samples can additionally or alternatively be stored in other types of memory, such as, for example, local GPU memory (GMEM) or cache memory.

If MSAA is used, the samples may be downsampled to generate the value of a pixel (e.g., RGB color values). For example, if 2×MSAA is used, there may be two samples determined for each pixel in a display. When the values are transferred to, for example, the system memory 230, the samples may be downsampled (e.g., averaged together) to determine the value of the pixel in the system memory 230. In some embodiments, as discussed in further detail below, the samples from some tiles may be downsampled (e.g., tiles associated with a higher resolution) and other tiles may have samples preserved (e.g., tiles associated with a lower resolution). Additionally, as also discussed in further detail below, some tiles (e.g., tiles associated with a lower resolution) may be upscaled to match a resolution of a display.

The values of the pixels stored in the system memory 230 can then be used to generate a display. For example, the values can indicate RGB color values of pixels, and the pixels can be set accordingly to generate the display.

The example of FIG. 2 illustrates aspects of a tiled rendering to generate graphics content. Alternatively or additionally other techniques may be used to generate the graphics content, consistent with disclosed embodiments.

Figure 3:
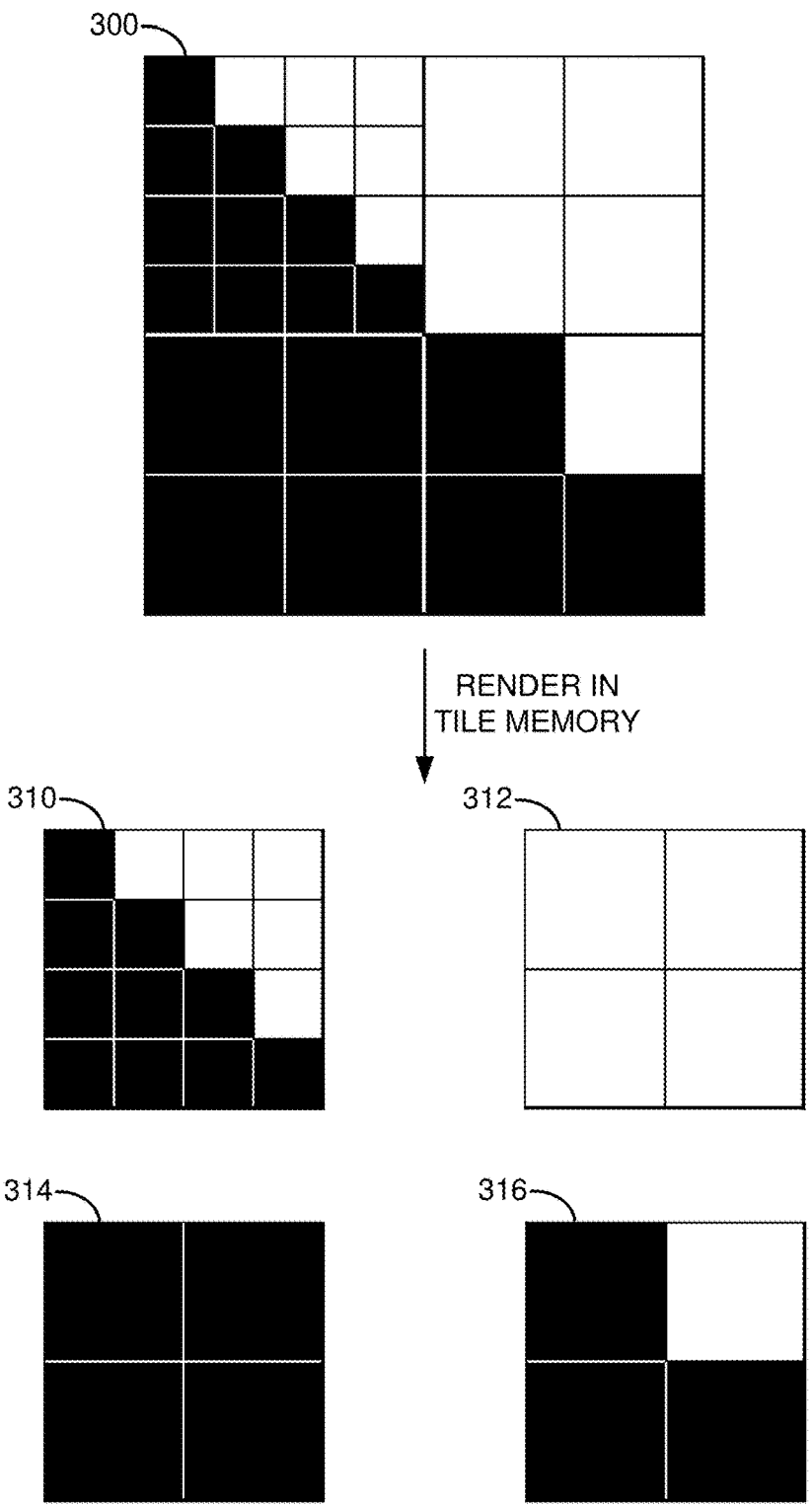
FIG. 3 is an example illustration of determining samples at different resolutions in different tiles, consistent with disclosed embodiments.

Referring to FIG. 3, an example illustration of determining samples at different resolutions in different tiles is shown. FIG. 3 depicts a frame 300 of graphics content. The frame 300 is shown merely for the sake of explanation, and may not depict an actual frame that is displayed or stored. The frame 300 includes four regions, a top left, a top right, a bottom left, and a bottom right region. The top left region is rendered at a higher resolution (compared to the other regions). For example, the top left region of the frame 300 may represent a region within the foveal vision of a user, and the other regions may represent regions within the peripheral vision of the user, as discussed above. Additionally, the other regions may be rendered at one fourth of the resolution of the top left region (i.e., a resolution scale of four).

For the sake of explanation, the frame 300 depicts sample values that may be determined, where the sample values are associated with one of two colors (black or white). The top left region, which is rendered at a higher resolution, includes more samples compared to the top right region, the bottom left region, and the bottom right region, which are rendered at a lower resolution.

When tiled rendering is used, the frame 300 may not be rendered as an entire frame. Instead, the frame 300 may be rendered in tiles (e.g., in tile memory), with each region associated with a tile, and each tile rendered separately and sequentially. For instance, the top left region can be rendered in a tile 310, the top right region can be rendered in a tile 312, the bottom left region can be rendered in a tile 314, and the bottom right region can be rendered in a tile 316. Accordingly, as depicted in FIG. 3, the colors for the samples in the frame 300, correspond to the colors of the samples in the respective tiles.

The frame 300 and the tiles 310-316 may represent samples that are determined when using MSAA. For example, the samples may be determined at 2×MSAA or 4×MSAA. Accordingly, for 2×MSAA, two samples may be associated with one pixel in system memory and/or in the display, and, for 4×MSAA, four samples may be associated with one pixel in system memory and/or in the display. As described in further detail below, this may be the case for higher resolution regions, where the MSAA factor (e.g., two for 2×MSAA and four for 4×MSAA) represents the number of samples that correspond to one pixel in system memory. Thus, in higher resolution regions, the samples may be downsampled at a scale that is equal to the MSAA factor. However, in lower resolution regions, the MSAA factor may not represent the number of samples that correspond to one pixel in system memory. As discussed in further detail below, sample values in lower resolution regions may be preserved (e.g., not downsampled or not downsampled at the same scale as a higher resolution region) and stored in system memory.

Figure 4A:
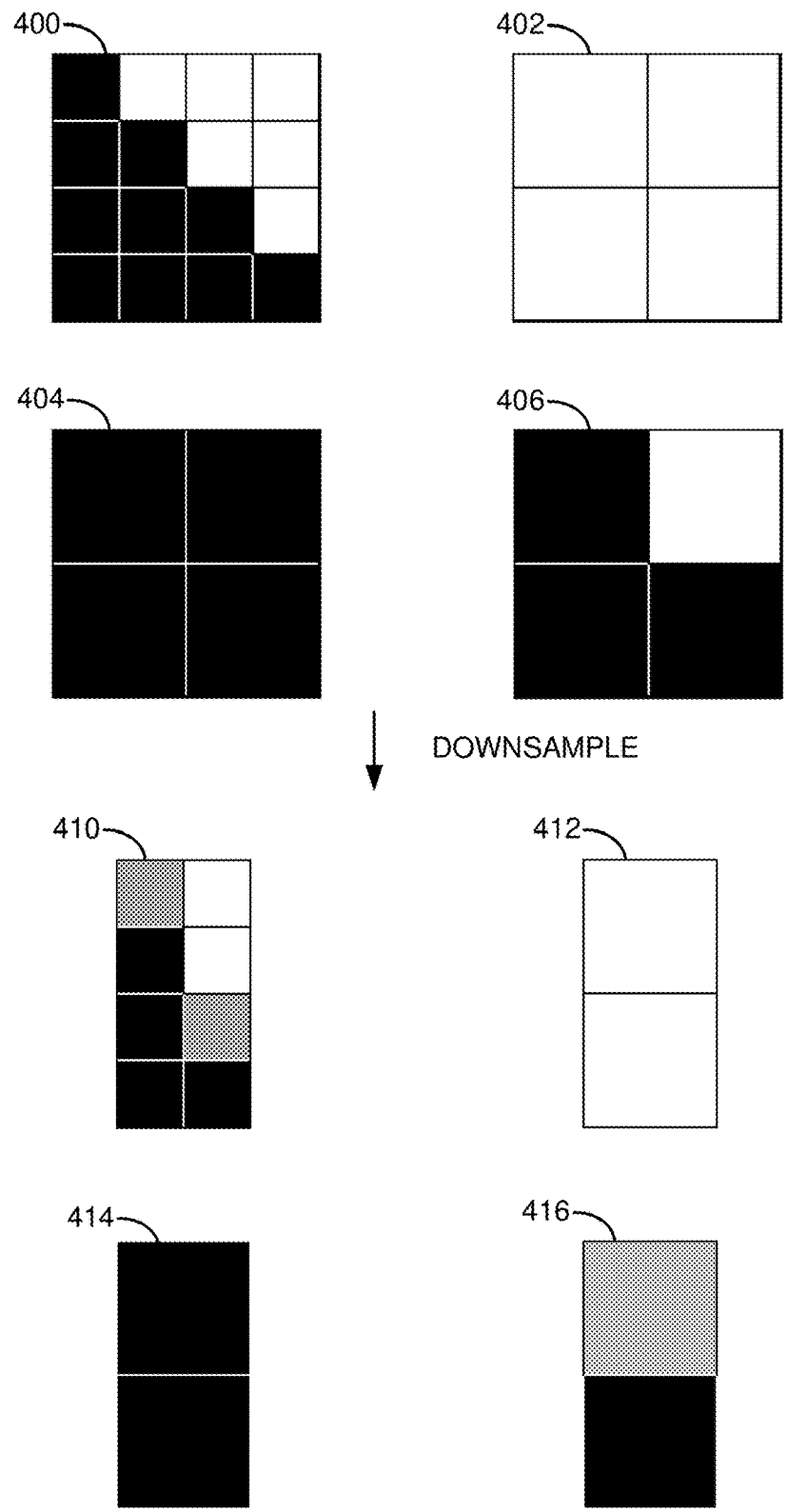
FIG. 4A is an example illustration of downsampling in multisample anti-aliasing at different resolutions, consistent with disclosed embodiments.

Referring to FIG. 4A, an example illustration of downsampling in multisample anti-aliasing at different resolutions is shown. FIG. 4A depicts a tile 400, a tile 402, a tile 404, and a tile 406, which, in some embodiments, may correspond to the tile 310, the tile 312, the tile 314, and the tile 316 (as depicted in FIG. 3), respectively. The tile 400 represents a tile rendered a higher resolution (compared to the other tiles). For example, the tile 400 may represent a region within the foveal vision of a user, and the other tiles may represent regions within the peripheral vision of the user, as discussed above. Additionally, the tiles 402-406 may be rendered at one fourth of the resolution of the tile 400.

Similar to FIG. 3, the tiles 400-406 depict sample values that may be determined, where the sample values are associated with one of two colors (black or white). The tile 400, which is rendered at a higher resolution, includes more samples compared to the tiles 402-406, which are rendered at a lower resolution.

When MSAA is used, some tiles may be downsampled according to the MSAA factor. In the example depicted in FIG. 4A, each of the tiles is downsampled according to an MSAA factor of two (i.e., corresponding to 2×MSAA) and there is no difference in sample values preserved between the higher resolution tile (the tile 400) and the lower resolution tiles (the tiles 402-406). Accordingly, the tile 400, a 4×4 tile, is downsampled to a tile 410, a 2×4 tile, the tile 402, the tile 404, and the tile 406, 2×2 tiles, are downsampled to a tile 412, a tile 414, and a tile 416, 1×2 tiles, respectively, and combined tile values are averaged. As depicted in FIG. 4A, a black tile that is combined with a black tile are averaged to a black tile, a white tile that is combined with a white tile are averaged to a white tile, and a black tile that is combined with a white tile are averaged to a gray tile.

Figure 4B:
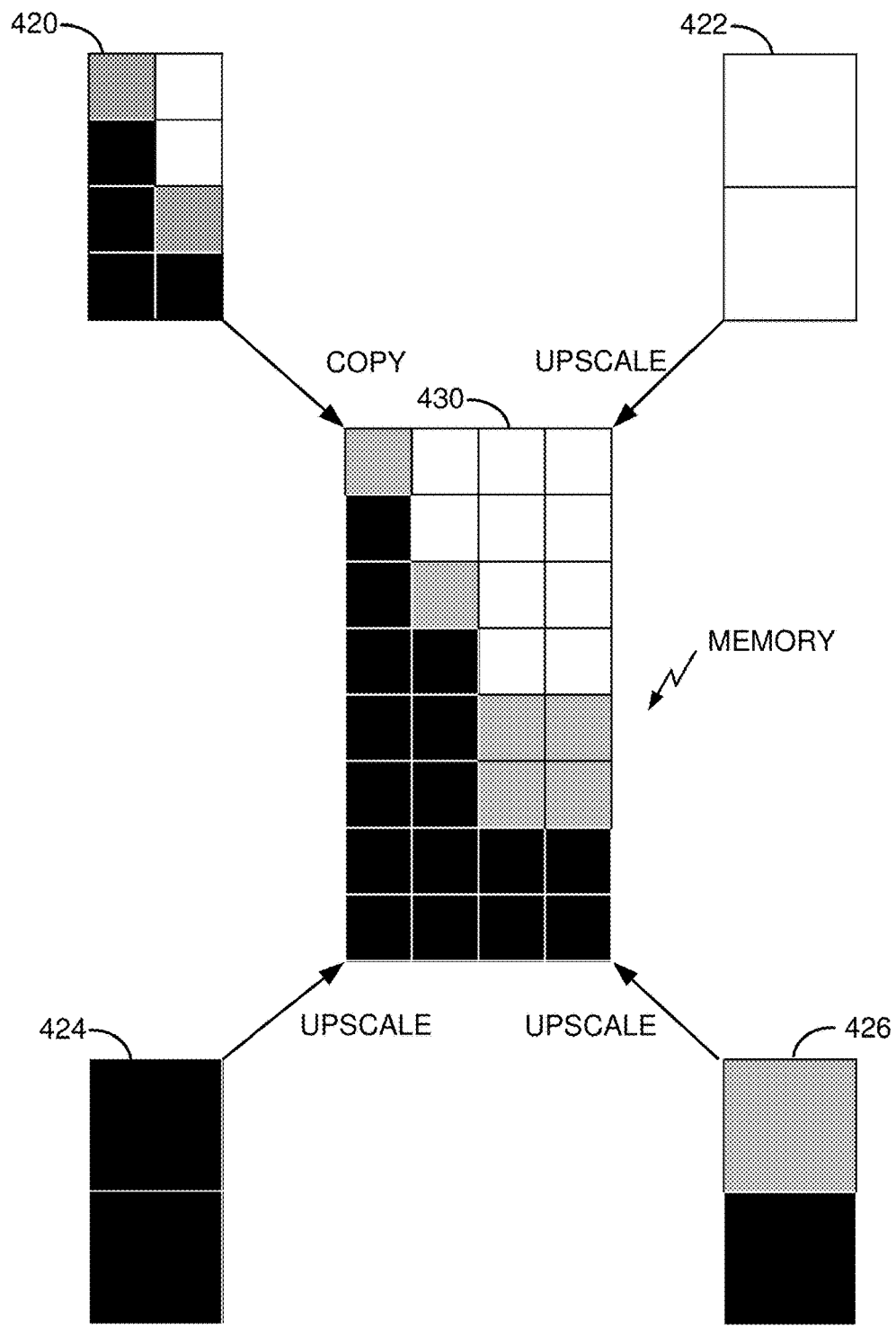
FIG. 4B is an example illustration of storing samples determined at different resolutions, consistent with disclosed embodiments.

Referring to FIG. 4B, an example illustration of storing samples at different resolutions is shown. FIG. 4B depicts a tile 420, a tile 422, a tile 424, and a tile 426, which, in some embodiments, may correspond to the tile 410, the tile 412, the tile 414, and the tile 416 (as depicted in FIG. 4A), respectively. Tile 420 represents a tile rendered at a higher resolution (compared to the other tiles) and downsampled such that some sample values are averaged (e.g., based on 2×MSAA, 4×MSAA, 8×MSAA, etc.). For example, the tile 420 may represent a region within the foveal vision of a user, and the other tiles may represent regions within the peripheral vision of the user, as discussed above. Additionally, the tiles 422-426 may have been rendered at one fourth of the resolution of the tile 420 and may be have been downsampled (e.g., by the same factor as the higher resolution tile) such that some sample values are averaged.

The tiles 420-426 depict sample values that may be determined, where the sample values are associated with one of three colors (black, white, and gray). The tile 420, which was rendered at a higher resolution, includes more samples compared to the tiles 402-406, which were rendered at a lower resolution.

Because the tile 420 was rendered at a higher resolution with MSAA and then downsampled, the tile 420 may include one value for each pixel position in memory (e.g., system memory, GMEM, etc.) and/or in a display. Accordingly, the sample values in the tile 420 may be copied to memory (shown in the top left region of a frame 430) and/or displayed on the display.

Because the tiles 422-426 were rendered at a lower resolution and then were downsampled after MSAA was used, the tiles may not include one value for each pixel position in system memory. As depicted in FIG. 4B, the tiles 422-426 include one value for four pixel positions in system memory. Accordingly, the tiles 422-426 are upscaled and then the sample values are stored. In other words, because one value represents four pixel positions, the one value is copied to each of the four pixel positions when the tile 422, the tile 424, and the tile 426 are copied to the top right region, the bottom left region, and the bottom right region of the frame 430, respectively. Using one sample value to represent multiple pixel positions can be referred to as "nearest sampling" upscaling because the sample nearest the multiple pixels is used as the value for the multiple pixels. Nearest sampling is only one of multiple possible upscaling processes. For example, in other embodiments, upscaling can be performed using "weighted sampling" upscaling where, instead of sample values being copied to multiple pixel positions, each pixel position can be assigned a value based on fractional weights of nearby samples. Example weighted samplings include bilinear weighted sampling or bicubic weighted sampling.

In some embodiments, the frame 430 may represent a frame rendered using foveated rendering and 2×MSAA with the lower resolutions regions rendered at one fourth of the resolution of the higher resolution region. For example, the samples depicted in FIG. 3 may represent the samples stored in system memory as the frame 430. Notably, there are differences between the frame 300 and the frame 430 because some sample values near edges were averaged. In particular, in the bottom right region of the frame 430, half of the pixel values are based on averages (not original values), and this could result in visible artifacts when the frame 430 is presented on a display.

Figure 5A:
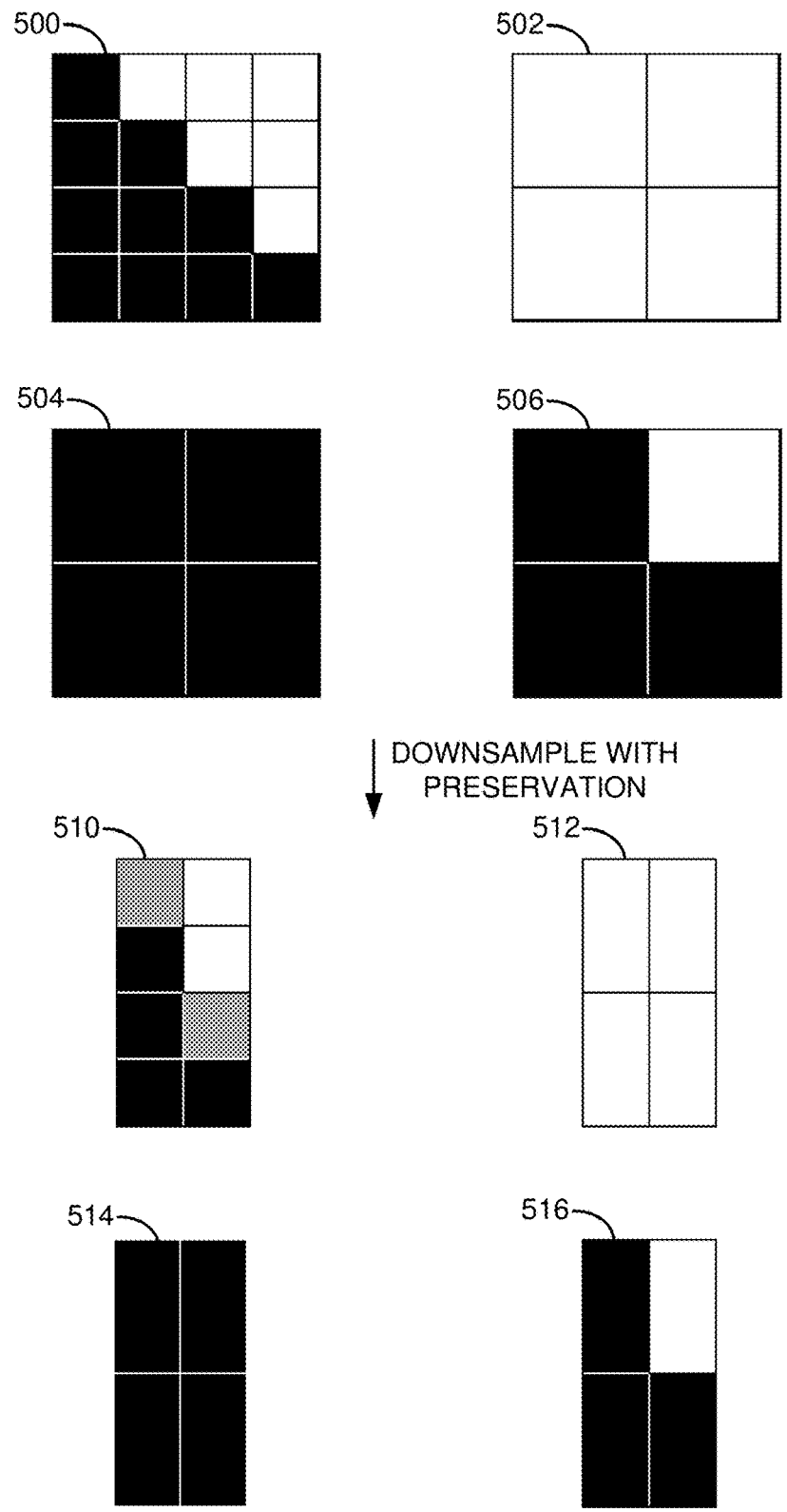
FIG. 5A is an example illustration of downsampling with preservation in multisample anti-aliasing at different resolutions, consistent with disclosed embodiments.

Referring to FIG. 5A, an example illustration of downsampling with preservation in multisample anti-aliasing at different resolutions is shown. FIG. 5A depicts a tile 500, a tile 502, a tile 504, and a tile 506, which, in some embodiments, may correspond to the tile 310, the tile 312, the tile 314, and the tile 316 (as depicted in FIG. 3), respectively. Tile 500 represents a tile rendered at a higher resolution (compared to the other tiles). For example, the tile 500 may represent a region within the foveal vision of a user, and the other tiles may represent regions within the peripheral vision of the user, as discussed above. Additionally, the tiles 502-506 may be rendered at one fourth of the resolution of the tile 500.

Similar to FIG. 3, the tiles 500-506 depict sample values that may be determined, where the sample values are associated with one of two colors (black or white). The tile 500, which is rendered at a higher resolution, includes more samples compared to the tiles 502-506, which are rendered at a lower resolution.

When MSAA is used, some tiles may be downsampled according to the MSAA factor. In the example depicted in FIG. 5A, the tile 500 is downsampled according to an MSAA factor of two (i.e., corresponding to 2×MSAA). However, the samples in the tiles 502-506 may not be downsampled, but, instead, may be preserved. In this example, the samples may be preserved without downsampling because the resolution scale of the tiles 502-506 (four in this example) is greater than or equal to the MSAA factor (two in this example). Accordingly, the tile 500, a 4×4 tile, is downsampled to a tile 510, a 2×4 tile, the tile 502, the tile 504, and the tile 506, 2×2 tiles, are not downsampled and correspond to a tile 512, a tile 514, and a tile 516, 2×2 tiles, respectively, and combined tile values are averaged. Accordingly, even though the tiles 502-506 are depicted differently than the tiles 512-516 in FIG. 5A, the tiles 502-506 may represent the same values as the tiles 512-516. Notably, the tile 516, with preserved sample values, is different than the tile 416 in FIG. 4A, where sample values are not preserved. As depicted in FIG. 5A, in the tile 516, the edge of the two colors is better preserved (compared to tile 416).

Figure 5B:
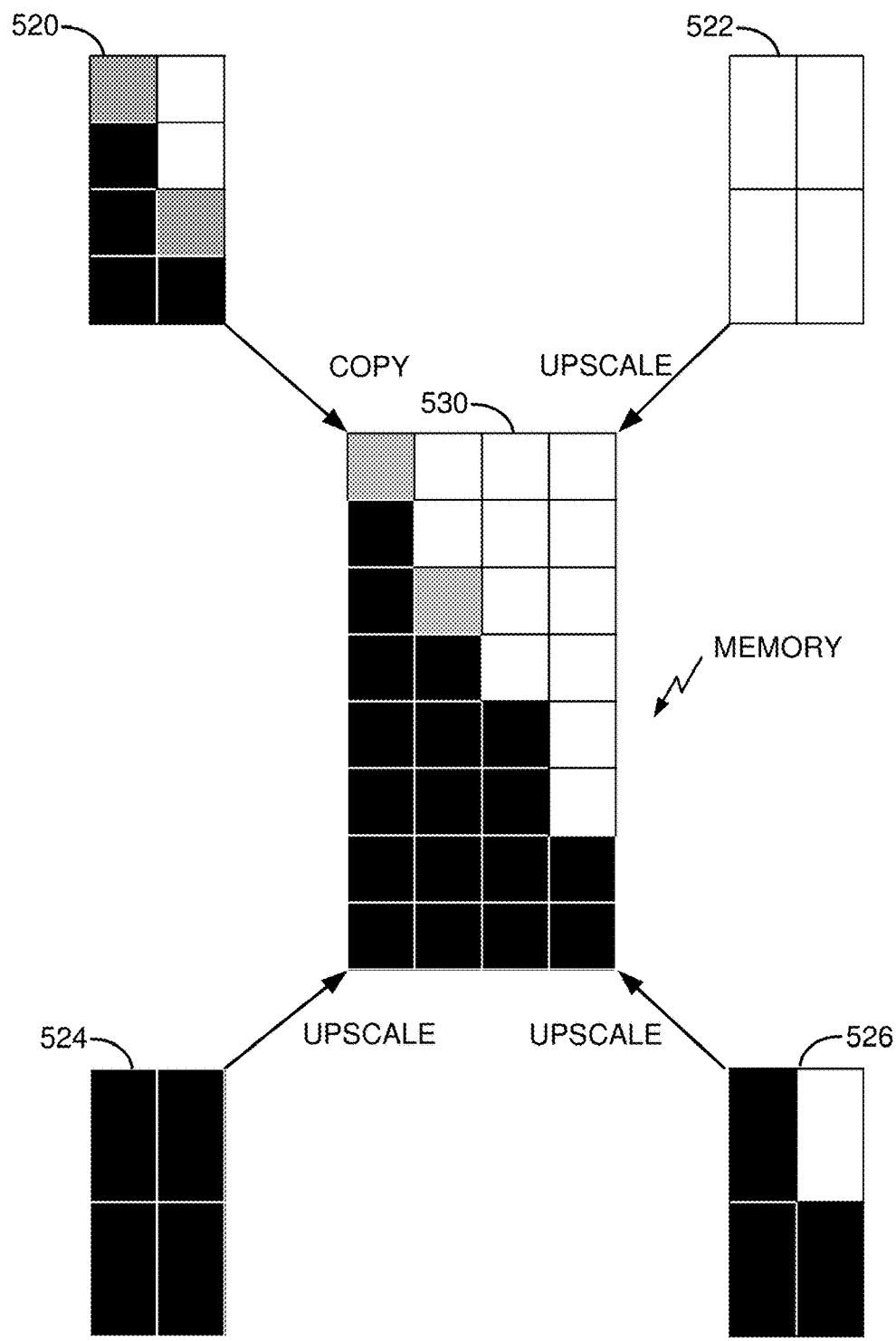
FIG. 5B is an example illustration of storing samples determined at different resolutions, consistent with disclosed embodiments.

Referring to FIG. 5B, an example illustration of storing samples at different resolutions is shown. FIG. 5B depicts a tile 520, a tile 522, a tile 524, and a tile 526, which, in some embodiments, may correspond to the tile 510, the tile 512, the tile 514, and the tile 516 (as depicted in FIG. 5A), respectively. The tile 520 represents a tile rendered at a higher resolution (compared to the other tiles) and downsampled such that some sample values are averaged (e.g., based on 2×MSAA, 4×MSAA, 8×MSAA, etc.). For example, the tile 520 may represent a region within the foveal vision of a user, and the other tiles may represent regions within the peripheral vision of the user, as discussed above. Additionally, the tiles 522-526 may have been rendered at one fourth of the resolution of the tile 520 and the sample values are preserved (in this example, by not downsampling).

The tiles 520-526 depict sample values that may be determined, where the sample values are associated with one of three colors (black, white, and gray). The tile 520, which was rendered at a higher resolution, includes more samples compared to the tiles 502-506, which were rendered at a lower resolution.

Because the tile 520 was rendered at a higher resolution with MSAA and then downsampled, the tile 520 may include one value for each pixel position in memory (e.g., system memory, GMEM, cache, etc.). Accordingly, the sample values in the tile 520 may be copied to memory (shown in the top left region of a frame 530).

Because the tiles 522-526 were rendered at a lower resolution, the tiles may not include one value for each pixel position in memory. However, because the sample values in the tiles may have been preserved (in this example, not downsampled) there may be more values for each pixel position than if downsampling had occurred. As depicted in FIG. 5B, the tiles 522-526 include one value for two pixel positions in memory. Accordingly, the tiles 522-526 are upscaled and then the sample values are stored in memory. In other words, because one value represents two pixel positions, the one value is copied to each of the two pixel positions when the tile 522, the tile 524, and the tile 526 are copied to the top right region, the bottom left region, and the bottom right region of the frame 530, respectively.

In some embodiments, the frame 530 may represent a frame rendered using foveated rendering and 2×MSAA with the lower resolutions regions rendered at one fourth of the resolution of the higher resolution region. For example, the samples depicted in FIG. 3 may represent the samples stored in memory as the frame 530. Notably, there are differences between the frame 300 and the frame 530 because some sample values near edges were averaged. However, the bottom right region of the frame 530, where samples were preserved, includes fewer averaged regions (in this case, no averaged regions) than frame 430 in FIG. 4B, where samples were not preserved. Thus, visible artifacts may be reduced when the frame 530 is presented on a display compared to when frame 430 is presented on a display.

Figure 6:
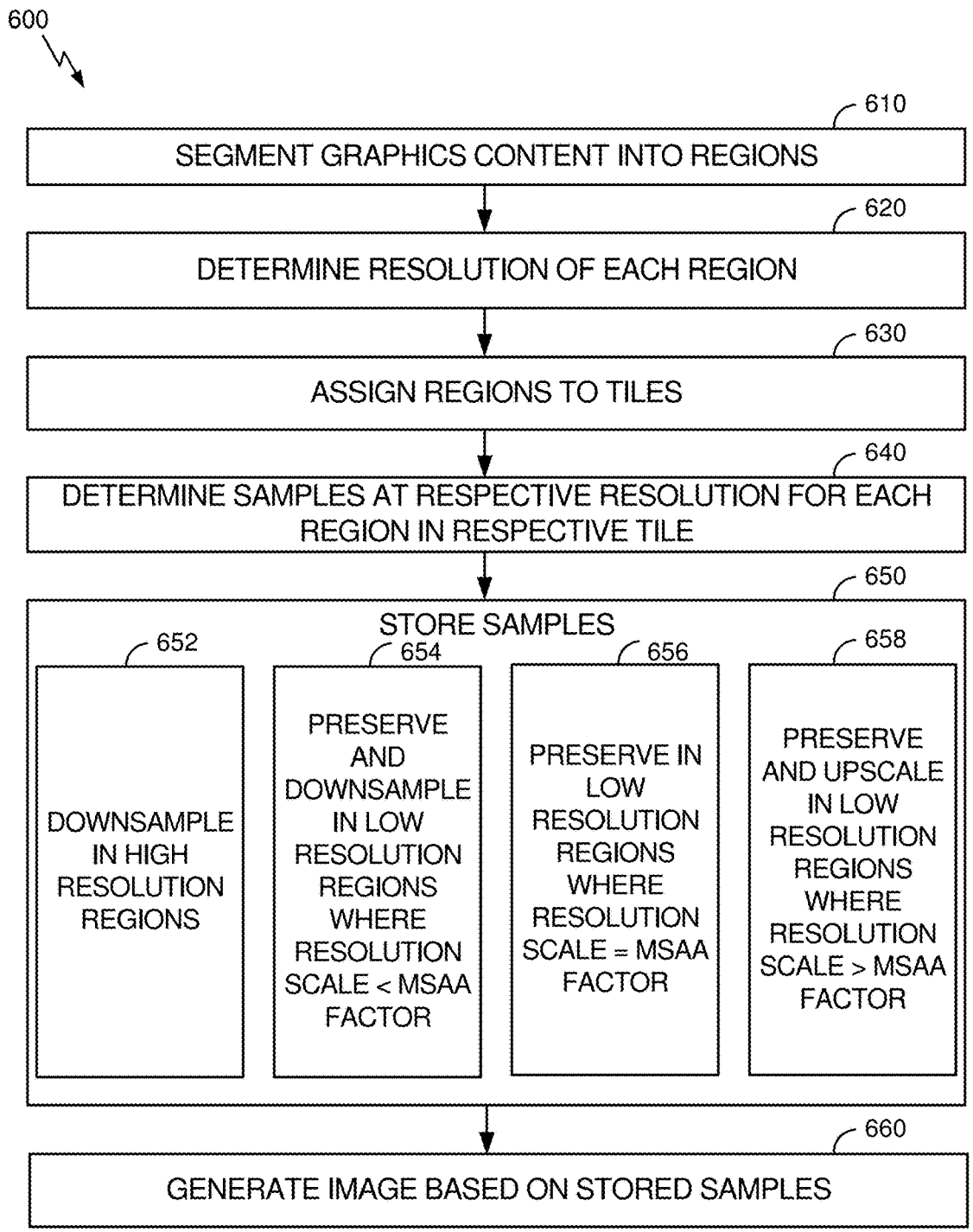
FIG. 6 is an example process of foveated rendering with multi-sample anti-aliasing, consistent with disclosed embodiments.

Referring to FIG. 6, an example process 600 of foveated rendering with multi-sample anti-aliasing is shown. In various embodiments, the example process 600 can be performed by a computing device, such as the device 100 depicted in FIG. 1, the device 200 depicted in FIG. 2, or a device 900 described below with regard to FIG. 9. Additionally or alternatively, in some embodiments, the computing device can be a VR headset, an AR headset, a cellular handset (or other wireless communication device), a laptop computer, a tablet computer, a desktop computer, a server, a set of networked devices, an advanced driver assistance system, a smartwatch, smart glasses, and the like. In various embodiments, the computing device may include, may be connected to, and/or may be able to transmit information to a display device.

In block 610, the computing device can segment graphics content into regions. In some embodiments, the regions may correspond to coordinates of an image for display and the regions may be the same size. In other embodiments, the regions may vary in size. In some implementations, the regions may be static and/or predetermined. In other words, the regions are preset for the computing device and/or for an application that is rendering graphics content, and the computing device may use the same regions in every instance of rendering graphics content or every instance of rendering graphics content for that application. In other implementations, the regions may be dynamic and derived by the computing device based on, for example, the complexity of the graphics content, the available memory, the priority of an application that is running, etc. In other words, the regions may vary while an application is generating graphics content and/or in different instances of an application.

In block 620, the computing device can determine a resolution of each region. In some embodiments, the computing device can determine to associate one or more regions with a higher resolution and one or more regions with a lower resolution (e.g., one half, one fourth, etc. of the higher resolution). In other embodiments, the computing device can associate one or more regions with a higher resolution, one or more regions with a first lower resolution (e.g., one half of the higher resolution), one or more regions with a second lower resolution (e.g., one fourth of the higher resolution), etc. Accordingly, there can be any number of different lower resolution regions.

In static foveated rendering embodiments, the resolution of each region can be predetermined. For example, the computing device may associate one or more center regions with a higher resolution and one or more outer regions with one or more lower resolutions.

In dynamic foveated rendering embodiments, the resolution of each region can be determined based on eye tracking information. For example, based on the eye tracking information, the one or more regions in the user's foveal vision can be identified, and those one or more regions can be associated with a higher resolution and the remaining regions can be associated with one or more lower resolutions. As a further example, the one or more regions in the user's foveal vision can be associated with a higher resolution, the one or more regions closest to the higher resolution region(s) can be associated with a first lower resolution (e.g., one fourth of the higher resolution), and the remaining one or more regions can be associated with a second lower resolution (e.g., one eighth of the higher resolution).

In block 630, the regions can be assigned to tiles (e.g., in tile memory). In some embodiments, each region can be assigned to a tile, while, in other embodiments, multiple regions can be assigned to a tile or a region can be segmented and assigned to multiple tiles.

In block 640, the computing device can determine samples of the graphics content. The samples can be determined at the resolution associated with the region (e.g., higher resolution, a first lower resolution, a second lower resolution, etc.). Additionally, the samples can be determined with MSAA (e.g., 2×MSAA, 4×MSAA, 8×MSAA, 16×MSAA, etc.). Accordingly, multiple samples can be determined for each pixel associated with a region. In some embodiments, the regions (segmented in to tiles) can be processed sequentially to reduce overall processing, memory, and bandwidth used. In further embodiments, regions can be processed in parallel to reduce processing times.

In block 650, the computing device can store samples that were in tiles into memory (e.g., into system memory, GMEM, cache, etc.).

For higher resolution regions, in block 652, the computing device can downsample the samples. For example, if 2×MSAA is used, the computing device can combine and average two samples for each pixel position in the higher resolution region, and, if 4×MSAA is used, the computing device can combine and average four samples for each pixel position in the higher resolution region. The values of the downsampled samples can be stored in memory.

For lower resolution regions where the resolution scale is less than the MSAA factor, in block 654, the computing device can preserve and downsample samples. In some embodiments, the computing device can preserve and downsample the samples by not downsampling by the MSAA factor, but by downsampling by the MSAA factor divided by the resolution scale. For instance, if the resolution scale of a lower resolution region is two (a resolution of one half of a higher resolution) and the MSAA factor is four (4×MSAA), then the computing device may downsample the region by two. The values of the downsampled samples can be stored in memory. Accordingly, some level of detail in the samples is preserved compared to downsampling all regions by the MSAA factor.

Some embodiments may not include lower resolution regions where the resolution scale is less than the MSAA factor, and, thus, the computing device may not perform block 654.

For lower resolution regions where the resolution scale is equal to the MSAA factor, in block 656, the computing device can preserve the samples. In some embodiments, the computing device can preserve by not downsampling and/or bypassing downsampling of the samples. The values of the samples in tile memory can be copied and stored in memory. Accordingly, the samples are preserved.

Some embodiments may not include lower resolution regions where the resolution scale is equal to the MSAA factor, and, thus, the computing device may not perform block 656.

For lower resolution regions where the resolution scale is greater than the MSAA factor, in block 658, the computing device can preserve and upscale the samples (e.g., as shown and described with regard to FIGS. 4A and 4B). In some embodiments, the computing device can preserve by not downsampling and/or bypassing downsampling of the samples. Additionally, because there are fewer samples than pixel positions, the samples can be upscaled by, in some examples, using the value of a sample for multiple pixel positions (nearest sampling) or, in other examples, using fractional parts of nearby samples (weighted sampling). The values of the samples can be upscaled and stored in memory. Accordingly, because downsampling is not performed, the samples are preserved.

Some embodiments may not include lower resolution regions where the resolution scale is greater than the MSAA factor, and, thus, the computing device may not perform block 658.

In block 660, the computing device can generate an image for display on the display device based on the samples stored in memory. For example, the computing device can use the sample values to adjust pixel values in an image file and/or on the display device.

Figure 7:
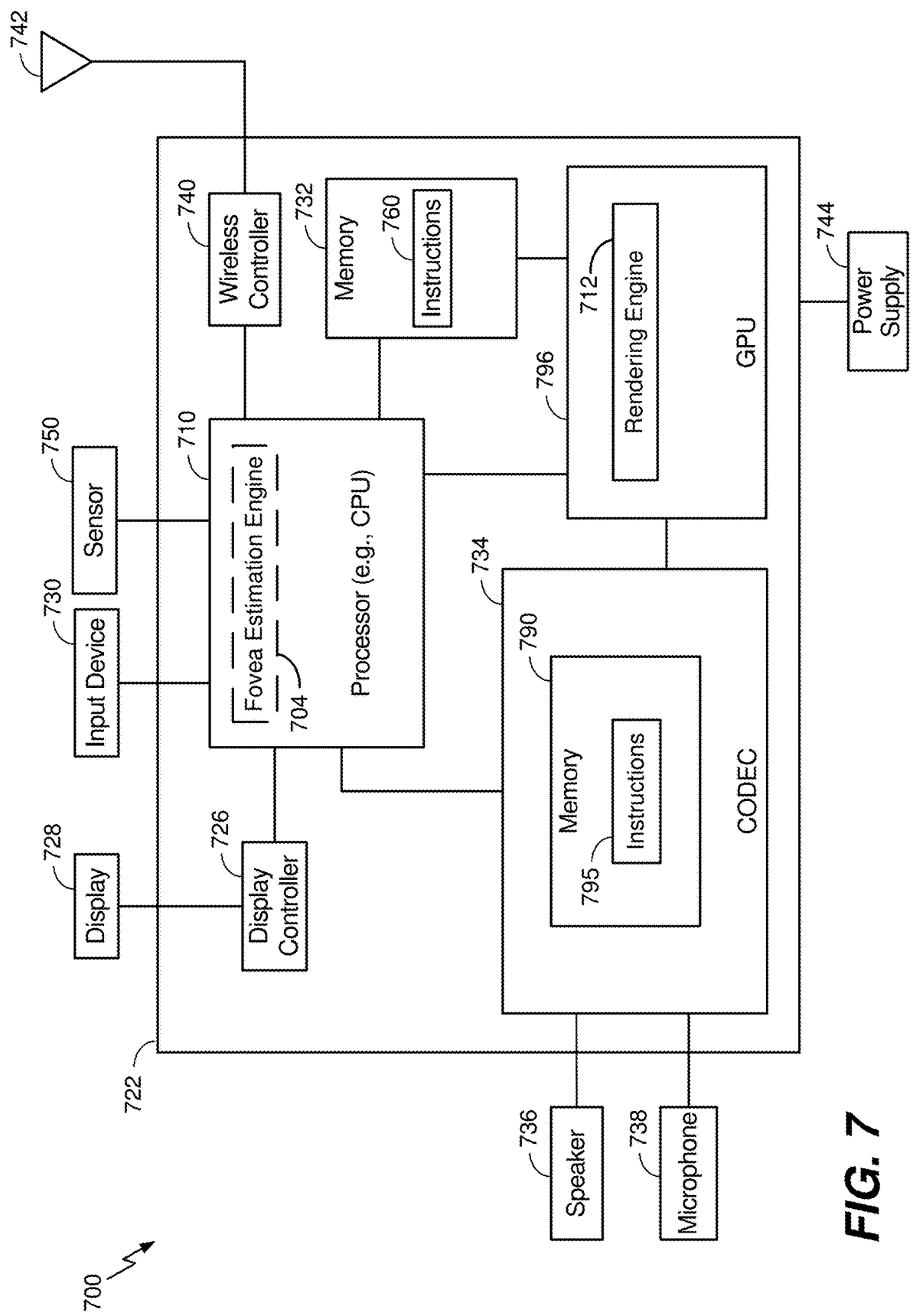
FIG. 7 is an example diagram of an electronic device that can perform foveated rendering, consistent with disclosed embodiments

Regarding to FIG. 7, an example diagram of an electronic device that can perform foveated rendering is depicted and generally designated as an electronic device 700. The electronic device 700 may correspond to a mobile device (e.g., a wireless communication device, such as a cellular handset), a computer (e.g., a server, a laptop computer, a tablet computer, or a desktop computer), an access point, a base station, a wearable electronic device (e.g., a personal camera, a head-mounted display, a VR headset, an AR headset, smart glasses, or a smartwatch), a vehicle control system or console (e.g., an advanced driver assistance system), an autonomous vehicle (e.g., a robotic car or a drone), a home appliance, a set top box, an entertainment device, a navigation device, a personal digital assistant (PDA), a television, a monitor, a tuner, a radio (e.g., a satellite radio), a music player (e.g., a digital music player or a portable music player), a video player (e.g., a digital video player, such as a digital video disc (DVD) player or a portable digital video player), a robot, a healthcare device, another electronic device, or a combination thereof.

The electronic device 700 includes one or more processors, such as a processor 710 and a graphics processing unit (GPU) 796. The processor 710 may include a central processing unit (CPU), a digital signal processor (DSP), another processing device, or a combination thereof. In the example of FIG. 7, the processor 710 may include the fovea estimation engine 704 and the GPU 796 may include the rendering engine 712. In other embodiments, the rendering engine 712 may be included in the processor 710 and/or the fovea estimation engine 704 may be included in the GPU 796, etc.

The processor 710 may be coupled to the GPU 796. In an illustrative example, the processor 710 may be configured to communicate with the GPU 796 using graphics application programming interface (API) calls. For example, the GPU 796 may include an API calls analyzer (not shown), and the processor 710 may be configured to provide the API calls to the API calls analyzer during graphics processing performed by the GPU 796.

The electronic device 700 may further include one or more memories, such as a memory 732. The memory 732 may be coupled to the processor 710, to the GPU 796, or to both. The memory 732 may include random access memory (RAM), magnetoresistive random access memory (MRAM), flash memory, read-only memory (ROM), programmable read-only memory (PROM), erasable programmable read-only memory (EPROM), electrically erasable programmable read-only memory (EEPROM), one or more registers, a hard disk, a removable disk, a compact disc read-only memory (CD-ROM), another memory device, or a combination thereof.

The memory 732 may store instructions 760. The instructions 760 may be executable by the processor 710, by the GPU 796, or by both. In some embodiments, the instructions 760 may instruct the processor 710 and/or the GPU 796 to perform the process described with regard to FIG. 6.

A coder/decoder (CODEC) 734 can also be coupled to the processor 710. The CODEC 734 may be coupled to one or more microphones, such as a microphone 738. The CODEC 734 may also be coupled to one or more speakers, such as a speaker 736. The CODEC 734 may include a memory 790 storing instructions 795 executable by the CODEC 734.

FIG. 7 also shows a display controller 726 that is coupled to the processor 710 and to a display 728. In some embodiments, the electronic device 700 may further include a wireless controller 740 coupled to an antenna 742. In other embodiments, the electronic device 700 may further include a wired network controller (not shown) coupled to a computer network cable.

The electronic device 700 may further include a sensor 750 (e.g., a camera). The sensor 750 may be any type of sensor configured to capture images of a user's eye(s). The fovea estimation engine 704 may be configured to identify eye position information based on the captured images from the sensor 750.

In a particular example, the processor 710, the GPU 796, the memory 732, the display controller 726, the CODEC 734, and the wireless controller 740 are included in a system-on-chip (SoC) device. Further, an input device 730 and a power supply 744 may be coupled to the SoC device 722. Moreover, in a particular example, as illustrated in FIG. 7, the display 728, the input device 730, the speaker 736, the microphone 738, the antenna 742, the power supply 744, and the sensor 750 are external to the SoC device 722. However, each of the display 728, the input device 730, the speaker 736, the microphone 738, the antenna 742, the power supply 744, and the sensor 750 can be coupled to a component of the SoC device 722, such as to an interface or to a controller.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

The foregoing disclosed devices and functionalities may be designed and represented using computer files (e.g. computer files in file formats that include Graphic Database System II (GDSII), GERBER, etc.). The computer files may be stored on computer-readable media. Some or all such files may be provided to fabrication handlers who fabricate devices based on such files. Resulting products include wafers that are then cut into die and packaged into integrated circuits (or "chips"). The integrated circuits are then employed in electronic devices, such as the electronic device 700 of FIG. 7.

Although certain examples have been described separately for convenience, it is noted that aspects of such examples may be suitably combined without departing from the scope of the disclosure. For example, the device 100 may be configured to operate based on aspects described with reference to each of FIGS. 2, 3, 4A, 4B, 5A, and 5B. Those of skill in the art will recognize other such modifications that are within the scope of the disclosure.

The various illustrative logical blocks, configurations, modules, circuits, and algorithm steps described in connection with the examples disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

One or more operations of a method or algorithm described herein may be embodied directly in hardware, in a software module executed by a processor, or in a combination of the two. For example, one or more operations of the process 600 of FIG. 6 may be initiated, controlled, or performed by a field-programmable gate array (FPGA) device, an application-specific integrated circuit (ASIC), a processing unit such as a CPU, a digital signal processor (DSP), a controller, another hardware device, a firmware device, or a combination thereof. A software module may reside in RAM, MRAM, flash memory, ROM, EPROM, EEPROM, registers, hard disk, a removable disk, a CD-ROM, or any other form of non-transitory storage medium known in the art. An exemplary storage medium is coupled to the processor such that the processor can read information from, and write information to, the storage medium. Additionally or in the alternative, the storage medium may be integral to the processor. The processor and the storage medium may reside in an ASIC. The ASIC may reside in a computing device or a user terminal. Additionally or in the alternative, the processor and the storage medium may reside as discrete components in a computing device or user terminal.

The previous description of the disclosed examples is provided to enable a person skilled in the art to make or use the disclosed examples. Various modifications to these examples will readily apparent to those skilled in the art, and the principles defined herein may be applied to other examples without departing from the scope of the disclosure. Thus, the present disclosure is not intended to be limited to the examples shown herein but is to be accorded the widest scope possible consistent with the principles and novel features as defined by the following claims.

What is claimed is:

1. A device for generating graphics content, comprising:
a memory; and
a processor coupled to the memory configured to cause the device to perform a method comprising:
    assigning a first region of the graphics content to a first tile of a plurality of tiles;
    assigning a second region of the graphics content to a second tile of the plurality of tiles;
    determining, at the first tile and at a first resolution, a first plurality of samples of the graphics content for each pixel of a plurality of pixels associated with the first region;
    determining, at the second tile and at a second resolution that is lower than the first resolution, a second plurality of samples of the graphics content for each pixel of a plurality of pixels associated with the second region;
    downsampling the first plurality of samples into a combined plurality of samples;
    preserving samples of the second plurality of samples to generate a third plurality of samples with preserved samples;
    storing the combined plurality of samples; and
    storing the third plurality of samples with preserved samples.

2. The device of claim 1, wherein the device comprises a virtual reality headset or a wireless communication device, the method further comprising:
    generating an image based on the combined plurality of samples and the third plurality of samples with preserved samples that are stored; and
    displaying the image.

3. The device of claim 1, wherein:
    downsampling the first plurality of samples comprises downsampling the first plurality of samples at a first scale; and
    preserving the samples comprises downsampling the second plurality of samples by a second scale that is less than the first scale.

4. The device of claim 1, wherein preserving the samples comprises copying the second plurality of samples in the second tile.

5. The device of claim 1, wherein preserving the samples comprises upscaling the second plurality of samples.

6. The device of claim 5, wherein the upscaling comprises nearest sampling.

7. The device of claim 5, wherein the upscaling comprises weighted sampling.

8. The device of claim 1, the method further comprising:
    determining that the first region is in the foveal vision of a user; and
    determining to render the first region at the first resolution based on determining that the first region is in the foveal vision of a user.

9. The device of claim 1, wherein:
    the first region is predetermined to be rendered at a first resolution; and
    the first region is a center region in the graphics content.

10. The device of claim 1, the method further comprising:
    assigning a third region of the graphics content to a third tile of the plurality of tiles; and
    determining, at the third tile and at a third resolution that is lower than the first resolution, a third plurality of samples of the graphics content for each pixel of a plurality of pixels associated with the third region, wherein the second resolution is different than the third resolution.

11. The device of claim 1, wherein the second resolution is at least one selected from the group consisting of one half of the first resolution, one fourth of the first resolution, and one eighth of the first resolution.

12. The device of claim 1, wherein a number of samples determined for each pixel of the graphics content is at least one selected from the group consisting of two, four, and eight.

13. The device of claim 1, wherein storing the combined plurality of samples and storing the third plurality of samples with preserved samples comprises storing the combined plurality of samples and the third plurality of samples with preserved samples in system memory.

14. A method for generating graphics content comprising:
    assigning a first region of the graphics content to a first tile of a plurality of tiles;
    assigning a second region of the graphics content to a second tile of the plurality of tiles;
    determining, at the first tile and at a first resolution, a first plurality of samples of the graphics content for each pixel of a plurality of pixels associated with the first region;
    determining, at the second tile and at a second resolution that is lower than the first resolution, a second plurality of samples of the graphics content for each pixel of a plurality of pixels associated with the second region;

downsampling, using a processor, the first plurality of samples into a combined plurality of samples;

preserving samples of the second plurality of samples to generate a third plurality of samples with preserved samples;

storing the combined plurality of samples; and storing the third plurality of samples with preserved samples.

15. The method of claim 14, further comprising:

generating an image based on the combined plurality of samples and the third plurality of samples with preserved samples that are stored; and displaying the image on a virtual reality headset or a wireless communication device.

16. The method of claim 14, wherein:

downsampling the first plurality of samples comprises downsampling the first plurality of samples at a first scale; and preserving the samples comprises downsampling the second plurality of samples by a second scale that is less than the first scale.

17. The method of claim 14, wherein preserving the samples comprises copying the second plurality of samples in the second tile.

18. The method of claim 14, wherein:

preserving the samples comprises upscaling the second plurality of samples; and the upscaling comprises nearest sampling or weighted sampling.

19. The method of claim 14, further comprising:

determining that the first region is in the foveal vision of a user; and determining to render the first region at the first resolution based on determining that the first region is in the foveal vision of a user.

20. A non-transitory computer-readable medium for generating graphics content, the non-transitory computer-readable medium storing a program containing instructions that, when executed by a processor of a device, cause the device to perform a method comprising:

assigning a first region of the graphics content to a first tile of a plurality of tiles;

assigning a second region of the graphics content to a second tile of the plurality of tiles;

determining, at the first tile and at a first resolution, a first plurality of samples of the graphics content for each pixel of a plurality of pixels associated with the first region;

determining, at the second tile and at a second resolution that is lower than the first resolution, a second plurality of samples of the graphics content for each pixel of a plurality of pixels associated with the second region;

downsampling the first plurality of samples into a combined plurality of samples;

preserving samples of the second plurality of samples to generate a third plurality of samples with preserved samples;

storing the combined plurality of samples; and storing the third plurality of samples with preserved samples.

* * * * *